(12) United States Patent
Wiesenberg et al.

(10) Patent No.: US 11,798,115 B2
(45) Date of Patent: Oct. 24, 2023

(54) VEHICLE CARGO TRANSPORTATION SYSTEM

(71) Applicant: Toyota Motor Engineering & Manufacturing North America, Inc., Plano, TX (US)

(72) Inventors: Ryan M. Wiesenberg, Ann Arbor, MI (US); John K. Lenneman, Okemos, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 271 days.

(21) Appl. No.: 17/087,436

(22) Filed: Nov. 2, 2020

(65) Prior Publication Data

US 2022/0138888 A1    May 5, 2022

(51) Int. Cl.
*G06Q 10/02* (2012.01)
*G06Q 50/30* (2012.01)
(Continued)

(52) U.S. Cl.
CPC ............. *G06Q 50/30* (2013.01); *G06Q 10/02* (2013.01); *G06Q 10/06315* (2013.01);
(Continued)

(58) Field of Classification Search
CPC .. G06Q 50/30; G06Q 10/02; G06Q 10/06315; G06V 20/59; G06V 20/64;
(Continued)

(56) References Cited

U.S. PATENT DOCUMENTS

2016/0187150 A1    6/2016  Sherman et al.
2018/0018619 A1*   1/2018  Kisiler ................ G06Q 10/083
(Continued)

FOREIGN PATENT DOCUMENTS

CN    110084388 A    8/2019
CN    110930747 A    3/2020

OTHER PUBLICATIONS

A. Kashevnik, N. Teslya and N. Shilov, "Smart space logistic service for real-time ridesharing," 2012 11th Conference of Open Innovations Association (FRUCT), St. Petersburg, Russia, 2012, pp. 53-62, doi: 10.23919/FRUCT.2012.8253108. (Year: 2012).*

*Primary Examiner* — Jeff Zimmerman
*Assistant Examiner* — Wayne S. Murray
(74) *Attorney, Agent, or Firm* — SNELL & WILMER LLP

(57) ABSTRACT

Methods, systems, and apparatus for transporting cargo. The system includes a vehicle having an electronic control unit (ECU) configured to communicate vehicle cargo data, the vehicle cargo data including dimensions of a cargo compartment and dimensions of one or more cargo compartment access points. The system also includes a mobile device configured to receive a transportation request from a user, the transportation request including a destination location and user cargo data. The system also includes a remote data server. The remote data server is configured to determine whether user cargo fits within the vehicle based on the vehicle cargo data and the user cargo data. The remote data server is configured to communicate an indication to the mobile device that the user cargo fits within the vehicle, causing the mobile device to render a user interface to provide a notification that the user cargo fits within the vehicle.

20 Claims, 10 Drawing Sheets

(51) Int. Cl.
*G06Q 10/0631* (2023.01)
*G06T 7/60* (2017.01)
*G07C 5/00* (2006.01)
*G06V 20/59* (2022.01)
*G06V 20/64* (2022.01)
*G07C 5/08* (2006.01)

(52) U.S. Cl.
CPC .............. *G06T 7/60* (2013.01); *G06V 20/59* (2022.01); *G06V 20/64* (2022.01); *G07C 5/008* (2013.01); *G07C 5/0808* (2013.01); *G07C 5/0825* (2013.01); *G06T 2207/30268* (2013.01)

(58) Field of Classification Search
CPC . G06T 7/60; G06T 2207/30268; G07C 5/008; G07C 5/0808; G07C 5/0825
See application file for complete search history.

(56) References Cited

U.S. PATENT DOCUMENTS

| | | |
|---|---|---|
| 2018/0202822 A1 | 7/2018 | DeLizio |
| 2019/0066038 A1* | 2/2019 | O'Brien ................. B65G 67/24 |
| 2019/0132715 A1 | 5/2019 | Marzouk |
| 2019/0143872 A1 | 5/2019 | Gil |
| 2019/0228492 A1 | 7/2019 | Mizutani et al. |
| 2019/0303805 A1* | 10/2019 | Mizutani ............ G06Q 10/0838 |
| 2020/0394746 A1* | 12/2020 | Krishnamurthy .... G06Q 10/083 |
| 2021/0150234 A1* | 5/2021 | Jablonski ............... G06Q 10/02 |
| 2021/0291877 A1* | 9/2021 | Yamamoto ...... B60W 60/00256 |

\* cited by examiner

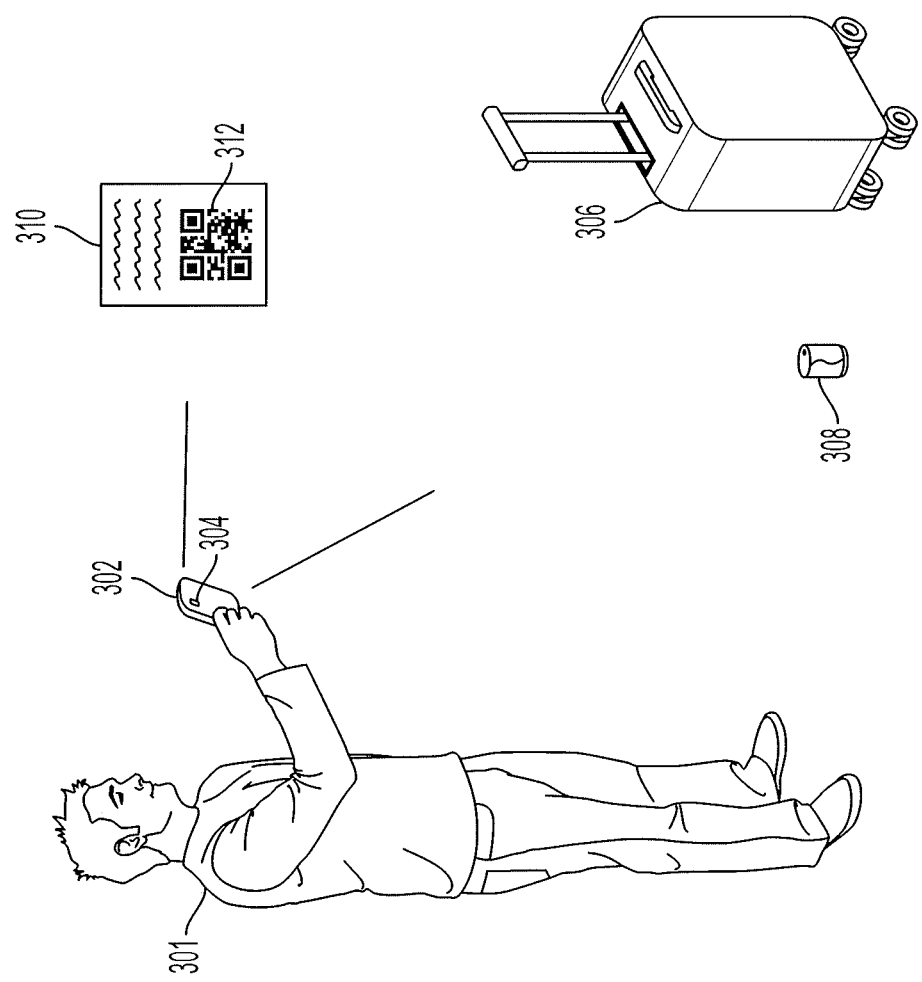

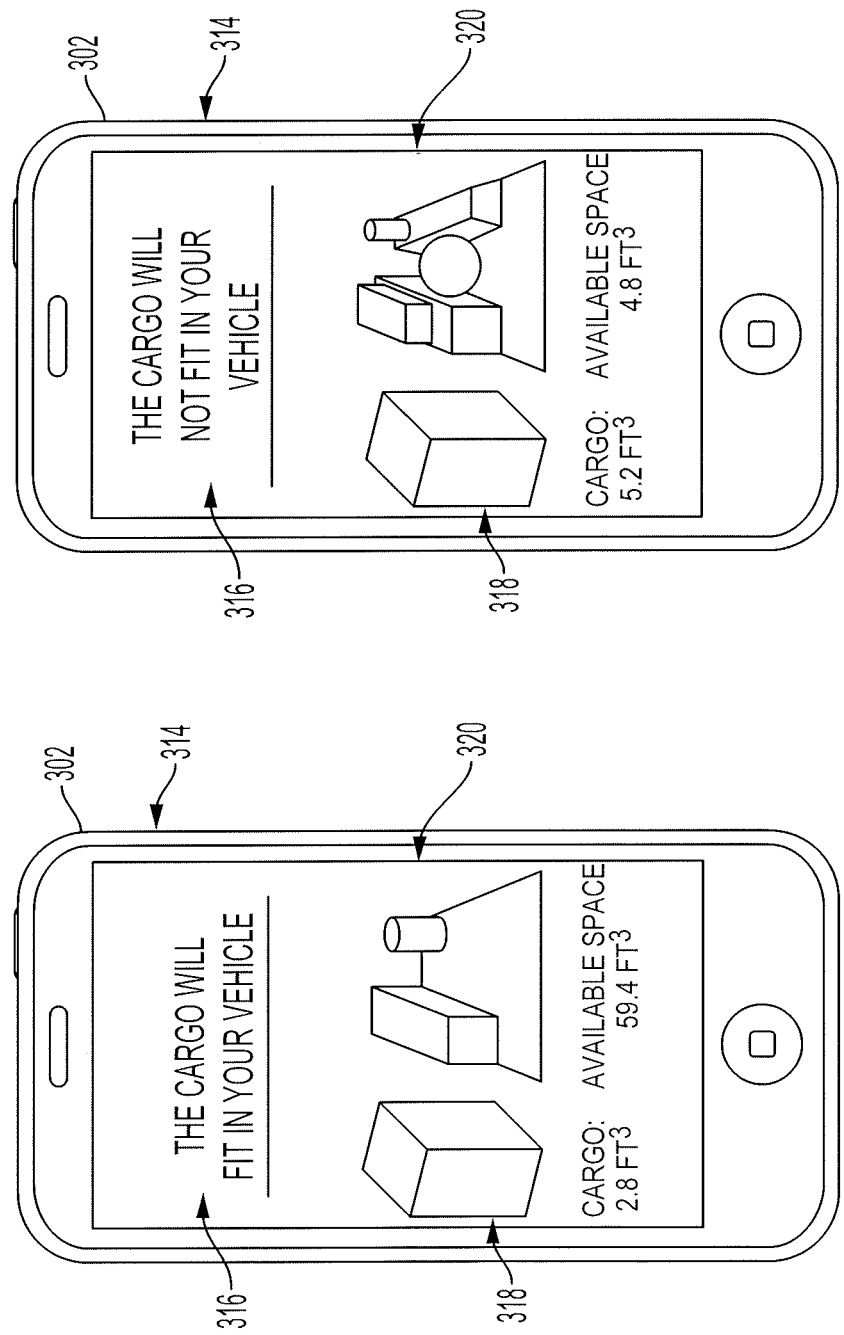

VEHICLE CARGO TRANSPORTATION SYSTEM

BACKGROUND

1. Field

This specification relates to a system and a method for transportation of cargo.

2. Description of the Related Art

A vehicle may be able to transport cargo. Some vehicles include a trunk defining a trunk space reserved for cargo of the one or more passengers of the vehicle. Other vehicles, such as trucks, have a truck bed for storing and transporting cargo. A truck bed may be open and exposed to the outside environment, or a truck bed cover may be used to protect the cargo from the outside environment. Vehicle cargo may also be stored and transported in the passenger cabin. Some vehicles include foldable seats that may collapse to provide a larger area for cargo storage and transportation.

In many situations, it may be difficult to determine ahead of time whether a particular piece of cargo will fit inside of the vehicle. This difficulty may be more pronounced when a vehicle is being shared, and it is not possible to determine how much cargo space of the vehicle has already been occupied by cargo of other occupants of the vehicle.

SUMMARY

What is described is a cargo transportation system. The system includes a vehicle having an electronic control unit (ECU) configured to communicate vehicle cargo data, the vehicle cargo data including dimensions of a cargo compartment and dimensions of one or more cargo compartment access points. The system also includes a mobile device configured to receive a transportation request from a user, the transportation request including a destination location and user cargo data, and communicate the transportation request. The system also includes a remote data server. The remote data server is configured to receive the vehicle cargo data from the vehicle. The remote data server is configured to receive the transportation request from the mobile device. The remote data server is configured to determine whether user cargo fits within the vehicle based on the vehicle cargo data and the user cargo data. The remote data server is configured to communicate an indication to the mobile device that the user cargo fits within the vehicle, causing the mobile device to render a user interface to provide a notification that the user cargo fits within the vehicle.

Also described is a method. The method includes communicating, by an electronic control unit (ECU) of a vehicle, vehicle cargo data, the vehicle cargo data including dimensions of a cargo compartment and dimensions of one or more cargo compartment access points. The method includes receiving, by a mobile device, a transportation request from a user, the transportation request including a destination location and user cargo data. The method includes receiving, by a remote data server, the vehicle cargo data from the vehicle. The method includes receiving, by the remote data server, the transportation request from the mobile device. The method includes determining, by the remote data server, whether user cargo fits within the vehicle based on the vehicle cargo data and the user cargo data. The method includes communicating, by the remote data server, an indication to the mobile device that the user cargo fits within the vehicle. The method includes rendering, by the mobile device, a user interface to provide a notification that the user cargo fits within the vehicle.

Also described is a cargo transportation system. The system includes a vehicle having an electronic control unit (ECU) configured to communicate vehicle cargo data, the vehicle cargo data including dimensions of a cargo compartment and dimensions of one or more cargo compartment access points. The system includes a mobile device configured to receive user cargo data associated with user cargo and compare the user cargo data with the vehicle cargo data to determine whether the user cargo fits within the cargo compartment of the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIG. 3A illustrates a user and user cargo, according to various embodiments of the invention.

FIGS. 3B-3C illustrate graphical user interfaces regarding the user cargo, according to various embodiments of the invention.

DETAILED DESCRIPTION

Disclosed herein are systems, vehicles, and methods for transporting cargo. The systems, vehicles, and methods disclosed herein automatically detect vehicle cargo data associated with the cargo compartment of a vehicle and compare the vehicle cargo data with user cargo data associated with user cargo. The user cargo data may be automatically determined using an image sensor of a mobile device. In this way, the user does not have to measure the user cargo and keep track of room within the vehicle. The systems, vehicles, and methods described herein are more accurate than conventional systems for determining whether user cargo will fit within a vehicle's cargo compartment. The vehicle may be used as part of transportation service technology to improve the accuracy and efficiency of the transportation service technology.

Figure 1:
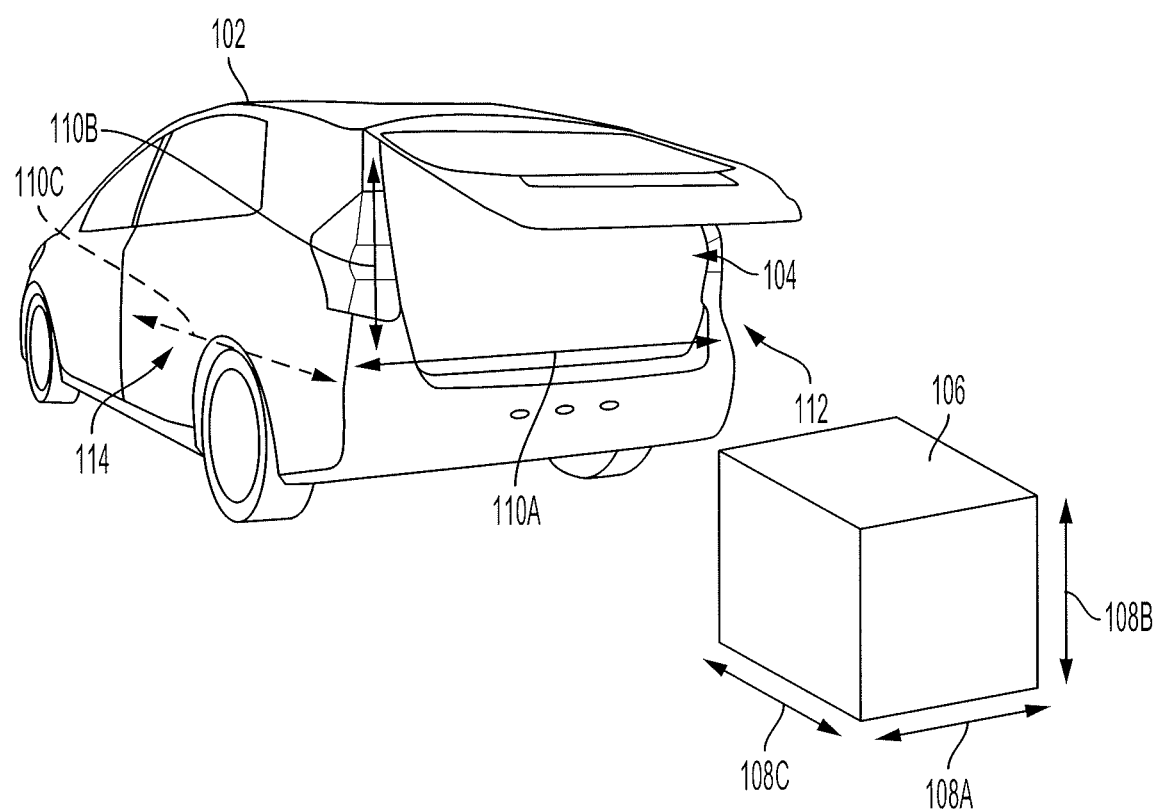
FIG. 1 illustrates a vehicle and cargo, according to various embodiments of the invention.

FIG. 1 illustrates a vehicle 102 having a cargo compartment 104. The cargo compartment 104 has dimensions 110 (e.g., width 110A, height 110B, depth 110C). The vehicle 102 has one or more cargo compartment access points. For example, the vehicle 102 has a first cargo compartment access point 112 covered by a tailgate of the vehicle 102, a second cargo compartment access point 114 covered by a left rear door of the vehicle 102, and a third cargo compartment access point covered by a right rear door of the vehicle 102. Each cargo compartment access point has its own respective dimensions.

The cargo 106 has dimensions 108 (e.g., width 108A, height 108B, length 108C). In some situations, the dimensions 108 of the cargo 106 may be within the dimensions 110 of the cargo compartment 104, but the cargo 106 will not fit within the cargo compartment 104 because the dimensions 110 of the cargo 106 exceed the dimensions of all of the cargo compartment access points. This may be due to design features of the vehicle at the cargo compartment access points. Thus, simply knowing the dimensions 110 of the cargo compartment 104 may not be sufficient to determine whether the cargo 106 will fit within the vehicle 102. In addition, in many situations, the dimensions of the cargo compartment access points are not two-dimensional openings, but rather three-dimensional. Also, there may be various interior surfaces of the vehicle adjacent to the cargo compartment access points. This may result in situations where the dimensions 108 of the cargo 106 being within the largest dimensions of the cargo compartment access points, but still unable to fit within the vehicle 102 because of various entry angles necessitated by the three-dimensional nature of the cargo compartment access points and the various interior surfaces of the vehicle adjacent to the cargo compartment access points.

It would be beneficial to know whether the cargo 106 could fit within the vehicle 102 without having to physically attempt to place the cargo 106 within the vehicle 102. In many situations, the cargo 106 is heavy or oddly shaped, and attempting to place the cargo 106 within the vehicle 102 and failing to place the cargo 106 within the vehicle 102 may result in injuries to the individuals attempting to place the cargo 106 within the vehicle 102 or damage to the cargo 106.

Thus, with respect to the cargo compartment of the vehicle 102, the cargo compartment dimensions, the cargo compartment access point dimensions and locations, and the layout and features of the cargo compartment are important in determining whether a given piece of cargo will fit within the cargo compartment.

While the cargo 106 is illustrated as being a cuboid, in many embodiments, the cargo 106 is oddly shaped. In addition, while the dimensions 110 of the cargo compartment 104 are shown as being a cuboid, in many embodiments, the cargo 106 is oddly shaped. In addition, while a van or SUV is shown as being vehicle 102, the vehicle 102 may be any vehicle, such as a sedan, a coupe, a hatchback, or a truck, for example.

Figure 2:
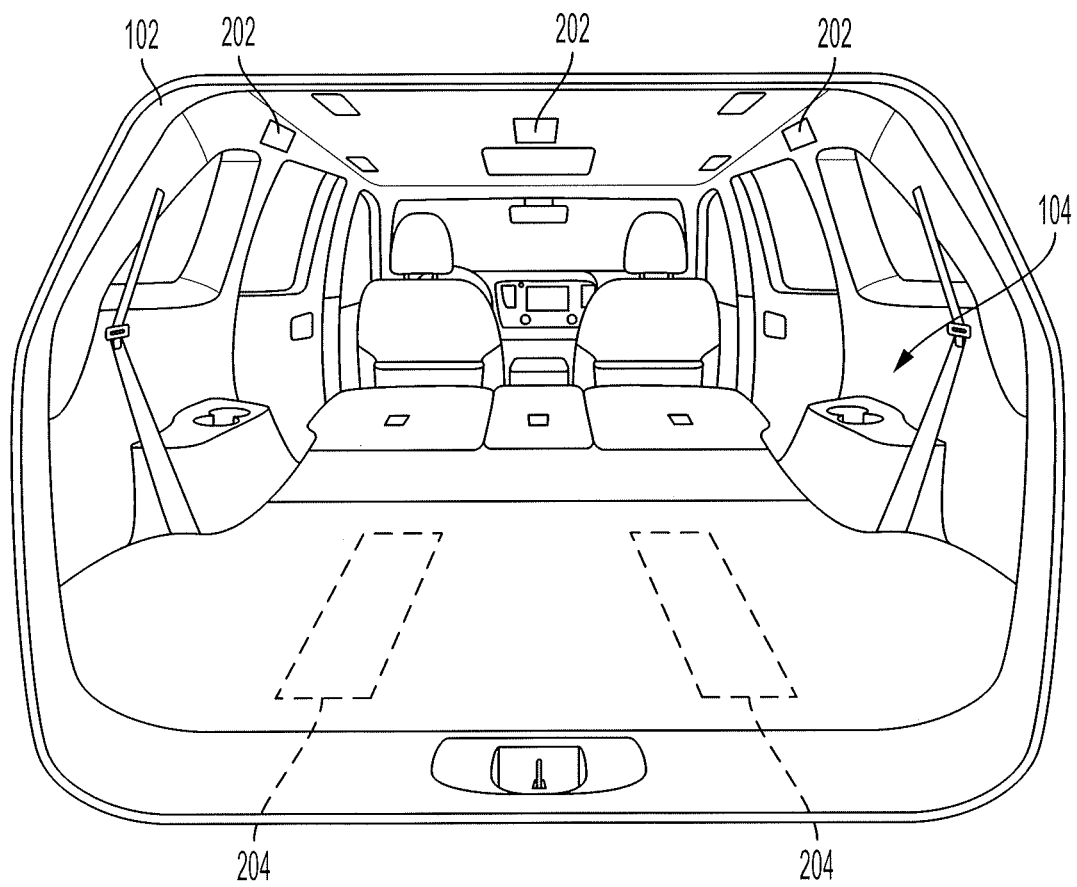
FIG. 2 illustrates a vehicle with cargo sensors, according to various embodiments of the invention.

FIG. 2 illustrates the cargo compartment 104 of the vehicle 102. Within the cargo compartment 104 are one or more image sensors 202 configured to detect image data within the cargo compartment 104. The image data may be analyzed by a computer processor of the vehicle (e.g., ECU) or a computer processor of a remote data server to automatically determine the dimensions 110 of the cargo compartment 104. The image data may also be analyzed to automatically determine the dimensions of the cargo compartment access points. The image sensors 202 may be located within the passenger cabin or cargo compartment of the vehicle and directed inward toward the passenger cabin or the cargo compartment.

During analysis of the image data, the features of the cargo compartment 104 may be compared to items having known dimensions (e.g., a headrest or a floor mat). In addition, known distances to various features may be used. For example, a distance from a particular image sensor 202 to the surface of a folded-down seat may be a particular length and a distance from the image sensor 202 to the surface of the rear window may be another particular length. Knowing these (and other) distances assists in automatically determining depth and scale of the objects in the images detected by the image sensors 202.

Machine learning techniques may be used to further refine accuracy of the dimension determination. For example, when a piece of cargo is placed in the cargo compartment 104, the exact dimensions of the piece of cargo may be provided to the processor (of the vehicle or the remote data server) and this may serve as training data or feedback data for improving accuracy of the dimension determination within the cargo compartment 104.

By using the image sensors 202, a real-time update on available cargo space may be provided to a user. For example, if two objects are currently located within the cargo compartment 104, the two objects would be detected by the image sensors 202 and the image data is automatically analyzed to determine a size of the two objects and a remaining space within the cargo compartment 104.

In addition to the image sensors 202, one or more weight sensors 204 within the cargo compartment, embedded in a horizontal surface (e.g., the floor or surface of a folded-down seat) may also be used. The location and size of the weight sensors 204 may be known, and the weight data detected by the weight sensors 204 may be used to determine a location, orientation, and size of cargo located within the vehicle 102.

The real-time update on the available cargo space may be presented to the user via a graphical user interface of a display screen. The display screen may be on an infotainment unit of the vehicle or a communicatively coupled computing device, such as a smartphone or a tablet or a laptop. The real-time update on the available cargo space may be particularly useful to a user who is shopping and would like to know whether a particular item will fit within the user's vehicle.

FIG. 3A illustrates a user 301 using a mobile device 302 to provide dimensions of the user cargo 306. The user 301 may manually provide the dimensions of the user cargo 306 using an input/output unit (e.g., touchscreen, microphone, stylus, keyboard) of the mobile device 302.

The user 301 may automatically provide the dimensions of the user cargo 306 using an image sensor 304 (e.g., a camera) of the mobile device 302. The user 301 may scan the area around the user cargo 306 to detect image data indicating context or comparison objects. The detection of context or comparison objects, such as a soda can 308 may assist in the automatic detection and determination of the dimensions of the user cargo 306. The user 301 may walk around the user cargo 306 to capture additional angles of the user cargo 306. Onboard sensors, such as an orientation sensor (e.g., IMU or gyroscope) or elevation sensor (e.g., altimeter) or location sensor (e.g., GPS device) of the mobile device 302 may be used to detect and determine a perspective of the mobile device 302 when capturing the user cargo 306 with the image sensor 304. This perspective may be used to determine a size of the user cargo 306.

For example, the image sensor may detect image data while the elevation sensor detects a height of the device, and the orientation sensor detects an angle of the device relative to the cargo. The image data, the elevation data, and the orientation data may be combined to determine the dimensions of the cargo as the user encircles the cargo, gathering data about the cargo. Once detected, the cargo data may be stored on the device.

The user 301 may also automatically provide the dimensions of the user cargo 306 using the image sensor 304 by scanning a code 312. The code 312 may be provided on a receipt of the user cargo 306 or on a tag of the user cargo 306. By scanning the code 312, the mobile device 302 may be automatically directed to a remote data server that provides the dimensions of the user cargo 306 to the mobile device 302.

For example, the user 301 may have patronized a store and purchased the user cargo 306. The receipt 310 may include the code 312, among other information. The user 301 may scan the code 312. The code 312 may automatically direct the mobile device 302 of the user 301 to a third-party database where the dimensions of the user cargo 306 are retrieved. In another example, the user 301 is within a store and is considering purchasing the user cargo 306 but is unsure of whether the user cargo 306 will fit in the user's vehicle. A tag 310 may be provided next to the user cargo 306 or on a tag attached to the user cargo 306. The user 301 scans the code 312 of a tag 310 and the dimensions of the user cargo 306 are retrieved, as described herein.

Now that the user 301 has the dimensions of the user cargo 306, the user 301 may use the dimensions of the user cargo 306. In some embodiments, the user 301 compares the dimensions of the user cargo 306 to the dimensions of the cargo compartment and the dimensions of the one or more cargo compartment access points of the user's vehicle. The user's vehicle may also provide a real-time update of the available dimensions of the cargo compartment and the available dimensions of the one or more cargo compartment access points of the user's vehicle, as described herein. In this way, the mobile device 302 may be communicatively coupled to the vehicle 102. The mobile device 302 may be directly communicatively coupled to the vehicle 102 or may be communicatively coupled to the vehicle 102 via one or more computing devices connected to a network, such as the Internet or a local area network. The mobile device 302 and the vehicle 102 may communicate various data such as the user cargo data and the vehicle cargo data.

In other embodiments, the dimensions of the user cargo 306 are provided to a transportation provider and used to match a vehicle capable of transporting the user cargo 306 along with the user 301.

FIG. 3B illustrates a mobile device 302 of the user rendering and displaying a graphical user interface 314 to the user regarding user cargo. The graphical user interface 314 may be provided to the user after the cargo data has been received or determined by the mobile device 302, as described herein with respect to FIG. 3A.

The graphical user interface 314 may include information 316 regarding whether the cargo will fit within the user's vehicle. In this situation, the user cargo will fit within the user's vehicle, allowing the user to know that the user will be able to transport the cargo home without physically placing the user cargo in the vehicle.

A representation of the user cargo and information about the user cargo 318 (e.g., a size or volume of the user cargo) may be shown in the graphical user interface 314. In addition, a representation of the cargo compartment and information about the cargo compartment 320 (e.g., remaining available space) may be shown in the graphical user interface 314. The representation of the cargo compartment may be an image of the cargo compartment detected by one or more of the image sensors within the vehicle, or the representation of the cargo compartment may be a computer-generated rendering of the cargo compartment and items therein. Similarly, the representation of the user cargo may be an image of the user cargo detected by an image sensor of the mobile device 302 or the representation of the user cargo may be a computer-generated rendering of the user cargo.

FIG. 3C illustrates a mobile device 302 of the user rendering and displaying a graphical user interface 314 to the user regarding user cargo. Similar to the graphical user interface 314 shown in FIG. 3B, the graphical user interface 314 of FIG. 3C may be provided to the user after the cargo data has been received or determined by the mobile device 302, as described herein with respect to FIG. 3A.

The graphical user interface 314 may include information 316 regarding whether the cargo will fit within the user's vehicle. In this situation, the user cargo will not fit within the user's vehicle, allowing the user to know that the user will not be able to transport the cargo home without physically placing the user cargo in the vehicle. Thus, the user may make alternate arrangements for the transportation of the user cargo. This may be particularly useful if the user is within a store and needs to determine whether to have an item delivered, or whether to transport the item themselves.

A representation of the user cargo and information about the user cargo 318 (e.g., a size or volume of the user cargo) may be shown in the graphical user interface 314. In addition, a representation of the cargo compartment and information about the cargo compartment 320 (e.g., remaining available space) may be shown in the graphical user interface 314. The representation of the cargo compartment may be an image of the cargo compartment detected by one or more of the image sensors within the vehicle, or the representation of the cargo compartment may be a computer-generated rendering of the cargo compartment and items therein. Similarly, the representation of the user cargo may be an image of the user cargo detected by an image sensor of the mobile device 302 or the representation of the user cargo may be a computer-generated rendering of the user cargo.

Figure 4A:
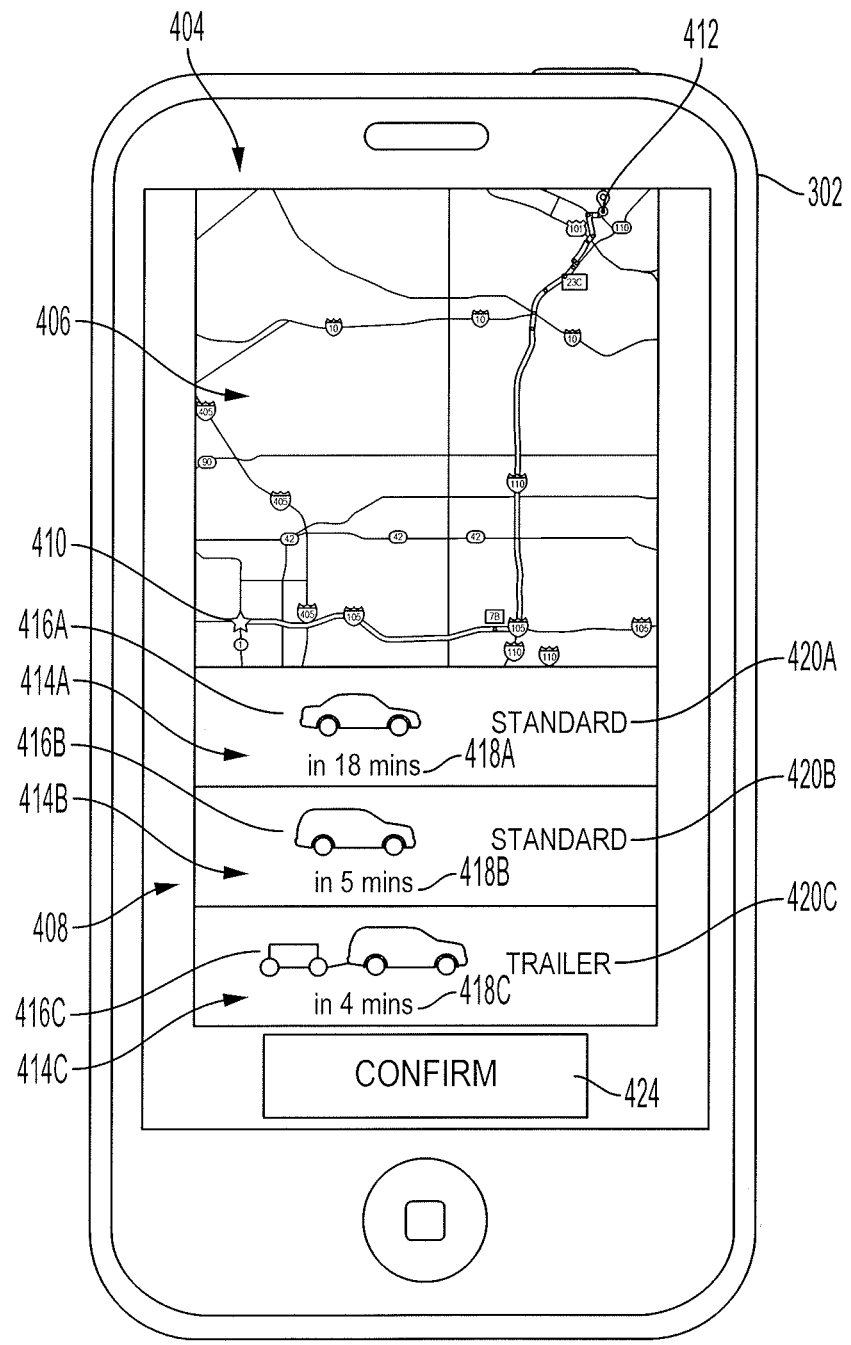
FIGS. 4A-4C illustrate graphical user interfaces of a mobile device, according to various embodiments of the invention.

FIG. 4A illustrates a mobile device 302. The mobile device 302 may be any device with a processor, a memory, an input device (e.g., touchscreen, mouse, keyboard, stylus), an output device (e.g., display screen, touchscreen), and a transceiver for communicating and receiving data. The mobile device 302 may be used by a user of mobility as a service (MaaS). MaaS is a technology that allows users to access transportation without having to be in possession of a vehicle. MaaS technology uses multiple network-connected (e.g., Internet-connected) devices, such as network-connected mobile devices (e.g., mobile device 302) and network-connected vehicles (e.g., vehicle 102). These network-connected devices communicate in real-time to provide users with transportation. For example, a network-connected mobile device may receive a user indication for transportation to a destination location. The network-connected mobile device may communicate a request to a remote data server for vehicles within a threshold vicinity (e.g., by distance or driving time) of the network-connected mobile device. The network-connected mobile device may communicate its location data (detected using a location sensor) to the remote data server in addition to the request for transportation.

The remote data server may communicate a real-time estimate of one or more vehicles in the vicinity of the network-connected mobile device that are available to provide transportation to the user. The real-time estimate may include at least one of a location of the one or more vehicles, an estimated time for the one or more vehicles to arrive to the user's current location, an estimated time to the destination location, an estimated cost associated with the transportation, and/or an estimated route of travel from the current location of the user to the destination location.

The location of the one or more vehicles may be determined by respective location sensors of the one or more vehicles, each configured to detect respective location data, which is communicated to the remote data server. The estimated time for the one or more vehicles to arrive to the user's current location may be determined by the remote data server based on location data from the one or more vehicles and the location data of the network-connected mobile device of the user. In addition, traffic data may be used to determine the estimated time for the one or more vehicles to arrive to the user's current location. The estimated time to the destination location and the estimated route of travel to the destination location may be determined based on traffic data and map data. The estimated cost associated with the transportation may be determined by the remote data server based on at least one of a time of day or day of the week, a fuel efficiency of the vehicle, a demand for transportation services relative to a supply of vehicles, and/or a size of the vehicle.

The location of the one or more vehicles, the estimated time for the one or more vehicles to arrive to the user's current location, the estimated time to the destination location, the estimated cost associated with the transportation, and the estimated route of travel from the current location of the user to the destination location may all change based on real-time data detected by sensors of the vehicles and real-time traffic data.

The user may provide user cargo data associated with cargo of the user. The user cargo data may be manually provided by the user to the mobile device 302 or may be automatically determined or retrieved by the mobile device 302, as described herein.

The eligible vehicles for transporting the user and the user cargo may be filtered based on the vehicles' cargo capability. The real-time cargo capability of each vehicle may be detected using one or more sensors of the vehicle, as described herein. Thus, a vehicle that is not capable of transporting the user and the user cargo will not be assigned to the user, preventing situations where the transportation request must be cancelled due to the inability of the vehicle to transport the user cargo.

The mobile device 302 is configured to render and display a graphical user interface 404. The processor may render the graphical user interface 404 and the output device may display the graphical user interface 404. The graphical user interface 404 includes a map 406 and a list 408. The map 406 shows the current location 410 of the user as well as the destination location 412 of the user. The current location 410 may be automatically detected using a location sensor of the mobile device 302 and the destination location 412 may be received from the user via an input device of the mobile device 302.

The list 408 includes one or more transportation options 414 (e.g., first option 414A, second option 414B, and third option 414C). Each transportation option 414 may include an image of the vehicle, an estimated time of arrival, a class of vehicle, and/or a cost of the vehicle.

The first option 414A includes an image of the vehicle 416A, a time estimate 418A, and a class of vehicle 420A. Similarly, the second option 414B includes an image of the vehicle 416B, a time estimate 418B, and a class of vehicle 420B. Similarly, the third option 414C includes an image of the vehicle 416C, a time estimate 418C, and a class of vehicle 420C.

For each vehicle, the image of the vehicle 416 may be used to show the user a type of vehicle 416 and/or a make and model of the vehicle 416. The time estimate 418 may be determined based on real-time location data of the vehicle 416 (detected by a location sensor of the vehicle) and real-time location data of the mobile device 302 (detected by a location sensor of the mobile device). The class of vehicle 420 may be associated with the type of vehicle. For example, vehicles that exceed a threshold number of seats or meet a list of amenities may be classified as DELUXE, vehicles that have an attached cargo storage unit may be classified as TRAILER, and all other vehicles may be classified as STANDARD. Any number of criteria may be used to classify vehicles.

Once the user has selected a transportation option 414, the user confirms by engaging the confirm icon 424. The remote data server receives the request and communicates an indication to the driver of the selected vehicle. The indication to the driver of the selected vehicle provides a location of the user so the driver may meet the user at the user's current location as well as the destination location.

Sensors of the vehicles (e.g., image sensors 202 and weight sensors 204) may be used to determine a real-time capacity of each vehicle 416 based on the cargo data provided by the user. For example, if an occupant of the first vehicle 416A adds an item of cargo to the cargo area, the sensors of the first vehicle 416A may detect the new cargo. The first vehicle 416A may detect a location and dimensions of the new cargo, and may then determine whether there is still room for the user's cargo within the cargo area of the first vehicle 416A. When the new cargo's addition results in insufficient room for the user's cargo, a notification may be provided to the driver and/or the user (via respective mobile devices). The notification to the driver may instruct the driver to remove or move the new cargo or refuse the transportation service to the user. The notification to the user may indicate that the vehicle may no longer be able to transport the user's cargo, and alternative vehicle transportation options may be presented.

In situations where a single vehicle provides transportation to multiple passengers in a trip, the cargo data from each passenger may be used to determine an order by which the driver should load and unload the passengers. For example, if the available cargo area of the vehicle is 36 inches wide by 55 inches deep by 22 inches tall, and there is a first passenger with a large flat object having dimensions of 32 inches wide by 50 inches long, the large flat object will likely be placed lying flat on the cargo area. If subsequent passengers each having relatively small cargo or no cargo are picked up after the first passenger, there may be relatively minor inconvenience with dropping off the first passenger at any time, as any additional cargo placed on top of the large flat object may be easily moved. However, if one or more subsequent passengers with relatively large cargo are picked up after the first passenger, the first passenger may be dropped off after all others with relatively large cargo are dropped off first, as removing and rearranging cargo may be difficult and time consuming.

In some embodiments, the sensors of the vehicle detect an arrangement of cargo and associate each piece of cargo with a passenger. The arrangement of cargo may be a factor in determining a drop-off sequence of the passengers. For example, a passenger with large, oddly shaped cargo may be dropped off after a passenger with several smaller pieces of cargo. The drop-off sequence may be adjusted in real-time. For example, if cargo associated with a particular passenger is removed during the trip, the drop-off sequence may change to drop off the particular passenger earlier than if the cargo remained in the vehicle, as the cargo was preventing an earlier drop off of the particular passenger.

The passenger sequence may also be determined based on whether any of the cargo is identified as being fragile. For example, if a vehicle has a large object that can only be laid down flat onto the cargo bed and cannot have any other cargo placed on top of it, the driver may not be able to pick up other passengers having cargo until the passenger with the fragile cargo is dropped off. The system may determine an added cost based on lost efficiency due to the fragile cargo, and the added cost, in part or in whole, may be added to the cost of the passenger with the fragile cargo.

These real-time adjustments may affect the time estimates (e.g., time estimate 418) provided to a user. The time estimates may be updated continuously or according to a schedule (e.g., every minute, every two minutes, every 5 minutes).

The sensors of the vehicle may also be used to determine an effective cargo capacity based on historical packing efficiency associated with the vehicle. Each vehicle may have design shapes and features that facilitate efficient cargo storage or prevent efficient cargo storage. In addition, in many situations, the driver of the vehicle places cargo inside of the vehicle upon picking up of the passenger. The sensors of the vehicle may detect a packing efficiency of the vehicle over time. For example, the sensors of the vehicle may detect an amount of remaining cargo area at all times, and the system may be aware of the size and shape of each item of cargo within the cargo area. The system may determine an optimal arrangement of the cargo and may compare a remaining room left in the optimal arrangement and may compare the remaining room left in the optimal arrangement with the current remaining room to determine a cargo packing efficiency. The system may also detect instances where a passenger's cargo is unable to be placed within the cargo area, despite anticipated room being available based on the existing cargo in the vehicle.

The packing efficiency of the vehicle may be based on the design of the vehicle and the packing skill of the driver, but could also be based on other factors, such as the shape and weight of the cargo. The historical packing efficiency may be used to determine a maximum realistic cargo capacity of the vehicle.

For example, the absolute cargo capacity of the vehicle may be 80 cubic feet. However, over time, the system may determine that, based on the sensor data from the vehicle, the historical packing efficiency associated with the vehicle is 81%. Thus, the effective cargo capacity of the vehicle is 64.8 cubic feet, and an aggregate amount of cargo exceeding 64.8 cubic feet will not be scheduled to be placed within the vehicle.

Various characteristics of the cargo may also be considered when determining the passenger sequence. For example, when a first passenger has an ice cream cake as cargo and a second passenger has several catering trays of hot food as cargo, the two passengers may not be scheduled to be in the vehicle at the same time. Alternatively, the driver and passengers may be provided with notifications to ensure the incompatible cargo are separated. In some situations, it may not be clear based on the appearance of the cargo what is inside the cargo and characteristics of the cargo.

Figure 4B:
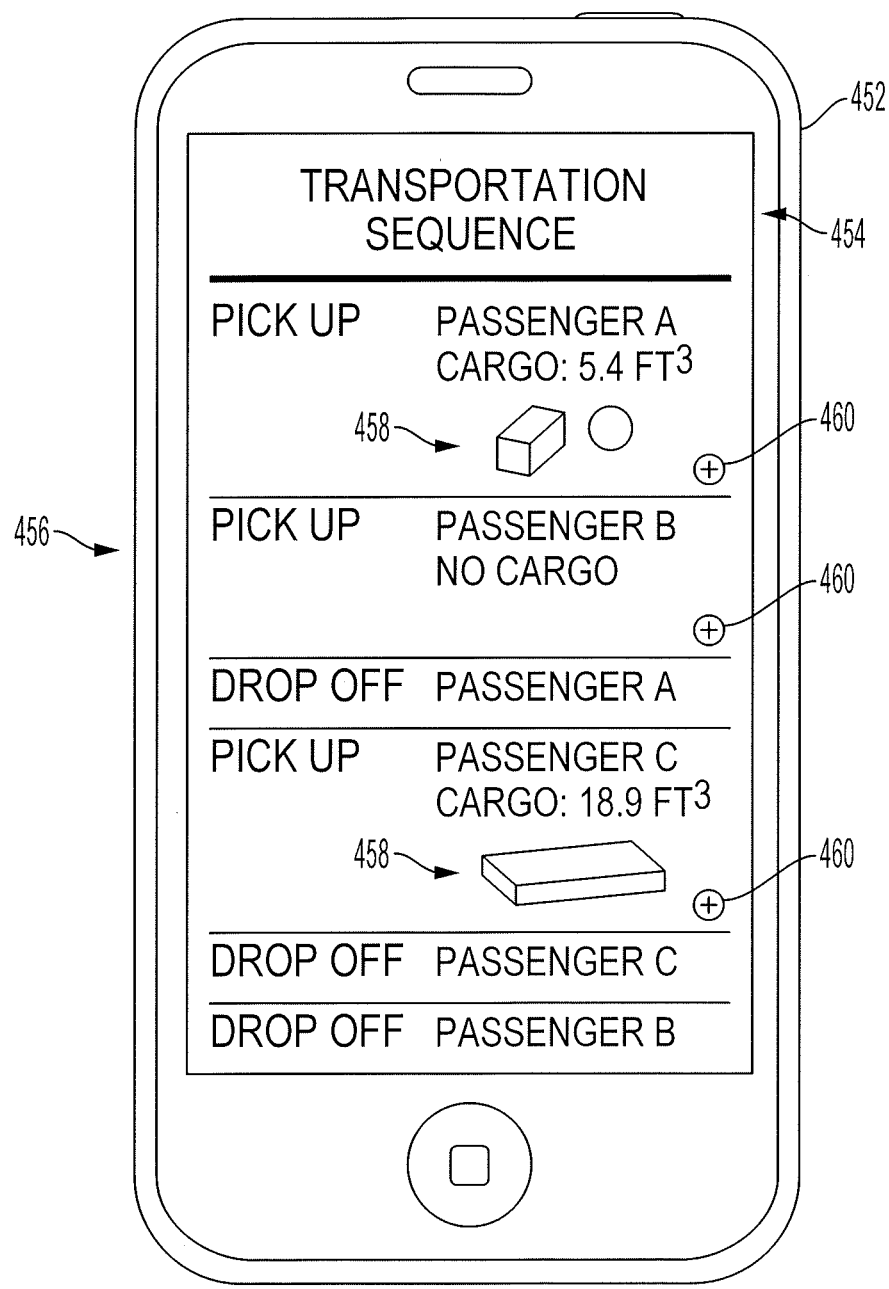

FIG. 4B illustrates a mobile device 452 of a driver providing transportation to various users. The mobile device 452 renders and displays a graphical user interface 454 of the sequence 456 of passenger pick-ups and drop-offs. The sequence 456 of the passenger pick-ups and drop-offs may be determined by a remote data server. The sequence 456 may be displayed in a list or in any other form. The graphical user interface 454 indicates when particular passengers have cargo, and also includes representations 458 of the cargo. The representations 458 of the cargo may be images detected by image sensors of the respective user's mobile device, or may be computer-generated renderings of the user cargo. The representations 458 may provide the driver with an expectation of what kinds of cargo may be accompanying the passenger. This may better inform the driver how to best arrange cargo within the cargo compartment of the vehicle, in anticipation of subsequent cargo.

In addition, an icon 460 may be provided next to each passenger pick up. The icon 460 may be selected by the driver to add cargo that was not known to the driver until the passenger was picked up. In some embodiments, the driver may use the driver's mobile device 452 to provide the system with cargo data associated with the new cargo, similar to the process shown with respect to FIG. 3A and described herein.

In addition, if there is room in the vehicle, a notification similar to that shown in FIG. 3B may be shown. If there is not room in the vehicle, a notification similar to that shown in FIG. 3C may be shown.

Figure 4C:
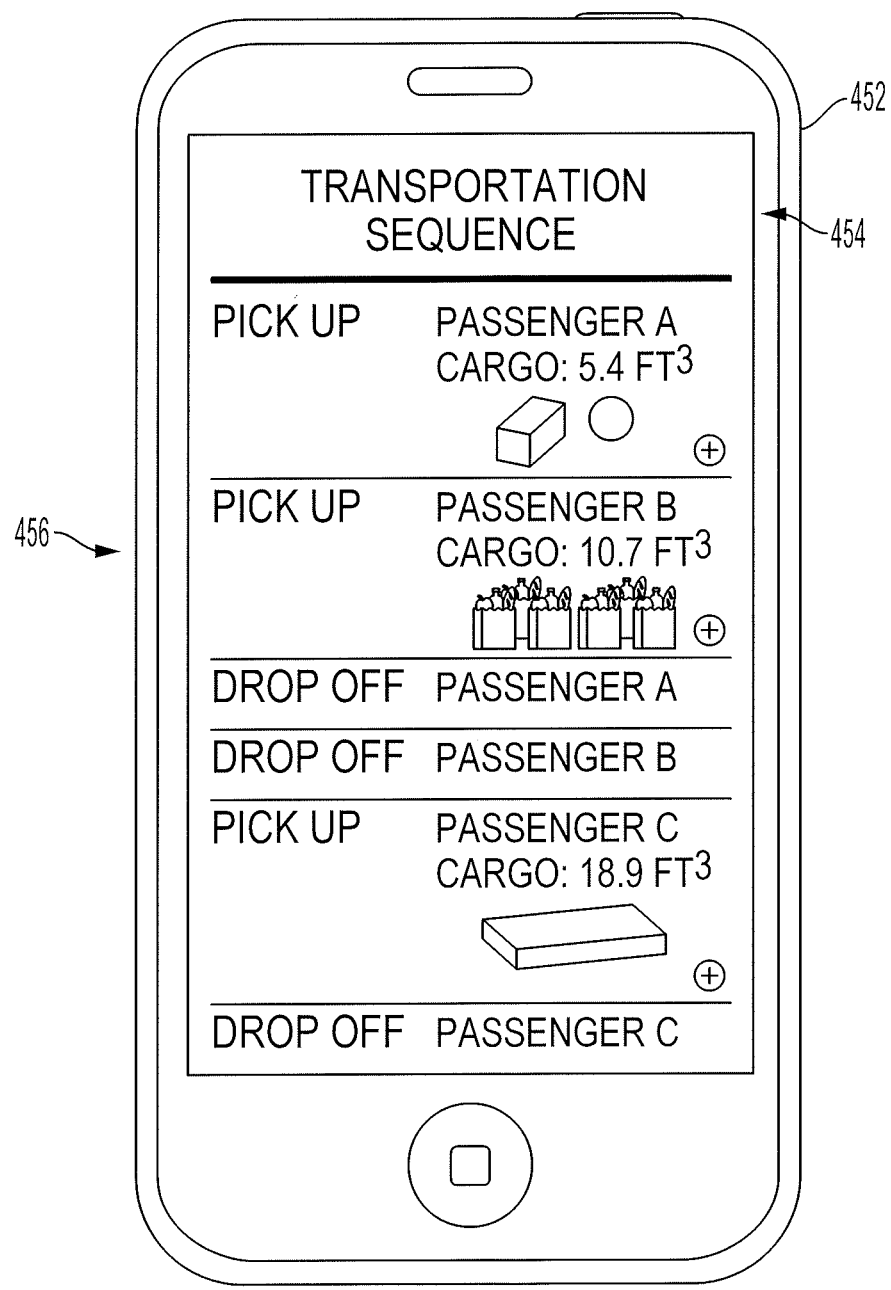

The addition of unexpected cargo may have downstream effects on the passengers of the vehicle. FIG. 4C illustrates a mobile device 452 of a driver providing transportation to various users. The mobile device 452 renders and displays a graphical user interface 454 of the sequence 456 of passenger pick-ups and drop-offs.

As shown in FIG. 4C, Passenger B has added cargo to the vehicle that was not expected. This causes a downstream effect to Passenger C. In particular, as shown in FIG. 4B, prior to the addition of the cargo of Passenger B, Passenger A was to be dropped off after picking up Passenger B, then Passenger C was to be picked up, then Passenger C was to be dropped off, and then Passenger B was to be dropped off. However, the addition of cargo by Passenger B means that Passenger C cannot be picked up until Passenger B is dropped off, as there is insufficient room for the cargo of Passenger B and Passenger C at the same time.

As shown in FIG. 4C, the sequence 456 is automatically updated for Passenger B to be dropped off before Passenger C is picked up. When the sequence is automatically updated, a notification may be sent to the respective mobile devices of the users (i.e., passengers) whose transportation plans are affected. The users may be automatically presented with an option to schedule transportation in a different vehicle. For example, when Passenger C is unable to be picked up due to the unexpected cargo of Passenger B, a notification may be provided by the mobile device of Passenger C, informing Passenger C of the change in transportation sequence. Passenger C may choose to arrange for alternate transportation if the delay is unacceptable to the user.

In addition, when Passenger B is picked up and has cargo that was not previously accounted for, and if adding Passenger B's cargo would cause a rearrangement and delay for another passenger, the picking up of Passenger B may be refused and alternate transportation arrangements may be made for Passenger B, in order for the existing schedule to be adhered to as closely as possible.

While FIGS. 4B and 4C illustrate mobile devices of the driver, in some embodiments, the vehicle (e.g., vehicle 102) of the driver renders and displays the graphical user interface 454 described herein. A display of an infotainment unit of the vehicle may display the rendered graphical user interface 454.

Figure 5:
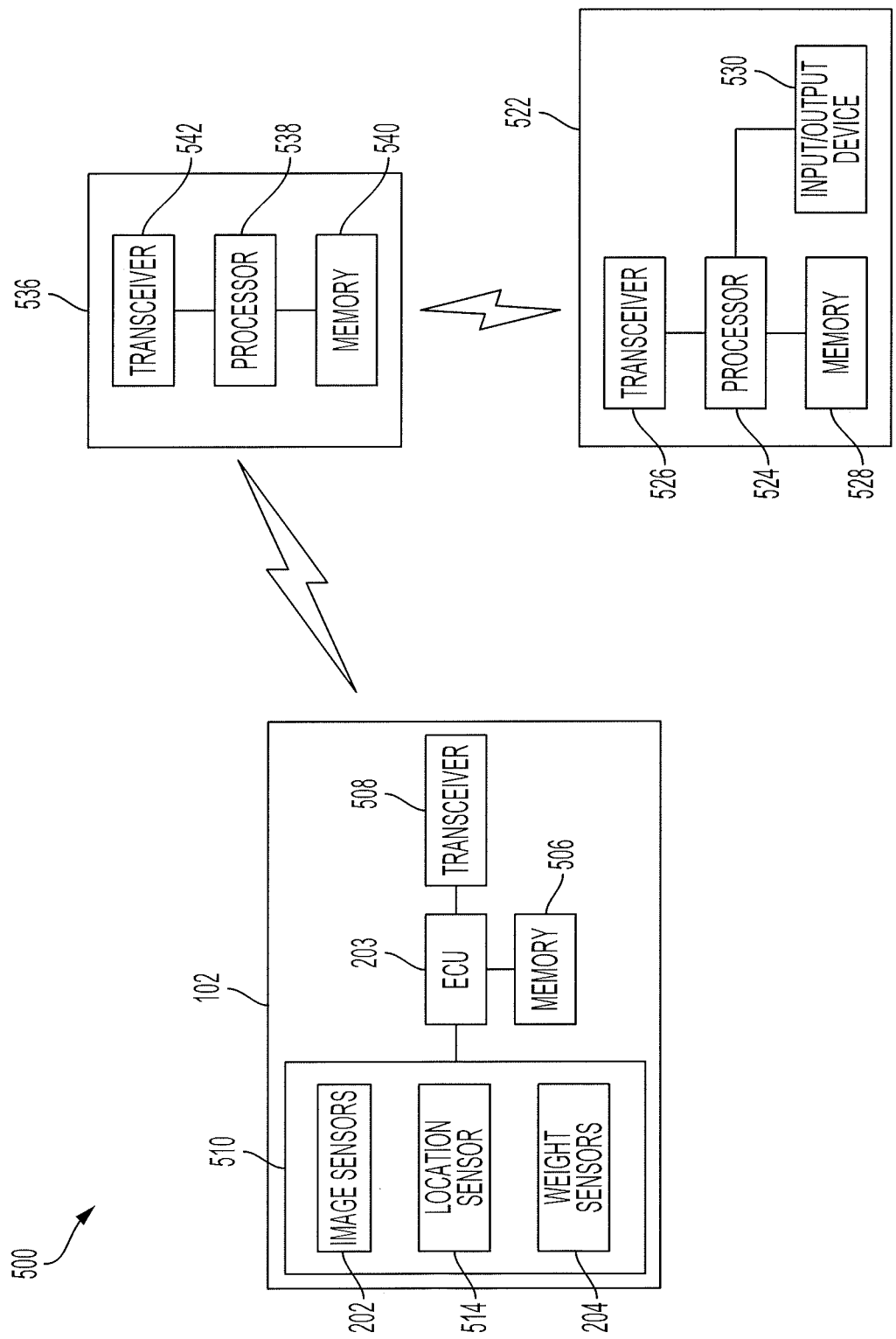
FIG. 5 is a block diagram of the system, according to various embodiments of the invention.

FIG. 5 illustrates an example system 500, according to various embodiments of the invention. The system may include a vehicle 102. The vehicle 102 may have an automatic or manual transmission. The vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor or battery driven vehicle. For example, the vehicle 102 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors and/or a navigation unit to drive autonomously.

The vehicle 102 also includes one or more computers or electronic control units (ECUs) 203, appropriately programmed, to control one or more operations of the vehicle 102. The one or more ECUs 203 may be implemented as a single ECU or in multiple ECUs. The ECU 203 may be electrically coupled to some or all of the components of the vehicle 102. In some embodiments, the ECU 203 is a central ECU configured to control one or more operations of the entire vehicle. In some embodiments, the ECU 203 is multiple ECUs located within the vehicle and each configured to control one or more local operations of the vehicle. In some embodiments, the ECU 203 is one or more computer processors or controllers configured to execute instructions stored in a non-transitory memory 506.

Although FIG. 5 illustrates various elements connected to the ECU 203, the elements of the vehicle 102 may be connected to each other using a communications bus.

The vehicle 102 may be coupled to a network. The network, such as a local area network (LAN), a wide area network (WAN), a cellular network, a digital short-range communication (DSRC), the Internet, or a combination thereof, connects the vehicle 102 to a remote data server 536. The remote data server 536 may include a non-transitory memory 540, a processor 538 configured to execute instructions stored in the non-transitory memory 540, and a transceiver 542 configured to transmit and receive data to and from other devices, such as vehicle 102. The remote data server 536 may be one or more servers from different service providers. Each of the one or more servers may be connected to one or more databases. A service provider may provide navigational map, weather and/or traffic data to the vehicle.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such the grade of an incline of a road, a terrain type of the road, or a curvature of the road. The construction information includes construction features such as construction zones and construction hazards.

The features, e.g., road features, political features, or traffic data, each have a location that may be identified by map coordinates. The map coordinates may be defined by latitude and longitude coordinates.

The transceiver 508 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 508 may transmit data to and receive data from devices and systems not directly connected to the vehicle. For example, the ECU 203 may communicate with the remote data server 536. Furthermore, the transceiver 508 may access the network, to which the remote data server 536 is also connected.

The vehicle 102 includes a sensor array 510 connected to the ECU. The sensor array includes image sensors 202, a location sensor 514, and weight sensors 204, each as described herein.

The image sensors 202 are configured to detect image data within the cargo compartment of the vehicle 102 and the weight sensors 204 are configured to detect weight data within the cargo compartment of the vehicle 102, each as described herein. The image data and the weight data may be used to determine the presence of cargo within the cargo compartment, as well as available space in the cargo compartment.

The location sensor 514 is configured to determine location data. The location sensor 514 may be a GPS unit or any other device for determining the location of the vehicle 102. The ECU 203 may use the location data along with the map data to determine a location of the vehicle. In other embodiments, the location sensor 514 has access to the map data and may determine the location of the vehicle and provide the location of the vehicle to the ECU 203.

The memory 506 is connected to the ECU 203 and may be connected to any other component of the vehicle. The memory 506 is configured to store any data described herein, such as the map data, the location data, the cargo data, the cargo storage efficiency data, and any data received from the remote data server 536 via the transceiver 508.

Also included in the system is a mobile device 522 (e.g., mobile device 202, 302, 452), which includes a processor 524 configured to execute instructions stored in non-transitory memory 528. The mobile device 522 also includes a transceiver 526 similar to transceiver 508 and transceiver 526. The mobile device 522 also includes an input/output device 530 configured to receive inputs from the user and display outputs to the user, as described herein. The input/output device 530 may be an input device (or input unit) such as a touchscreen, a microphone, a stylus, or a keyboard and an output device (or output unit) such as a touchscreen, a display screen, or a speaker.

As described herein, the mobile device 522 may be used to detect cargo data associated with the user cargo. The mobile device 522 may also be used to arrange for transportation, and the cargo data may be communicated when arranging for the transportation. In other embodiments, the mobile device 522 may be a driver's mobile device and the mobile device 522 may be used to schedule transportation requests, as described herein.

As used herein, a "unit" may refer to hardware components, such as one or more computer processors, controllers, or computing devices configured to execute instructions stored in a non-transitory memory.

Figure 6A:
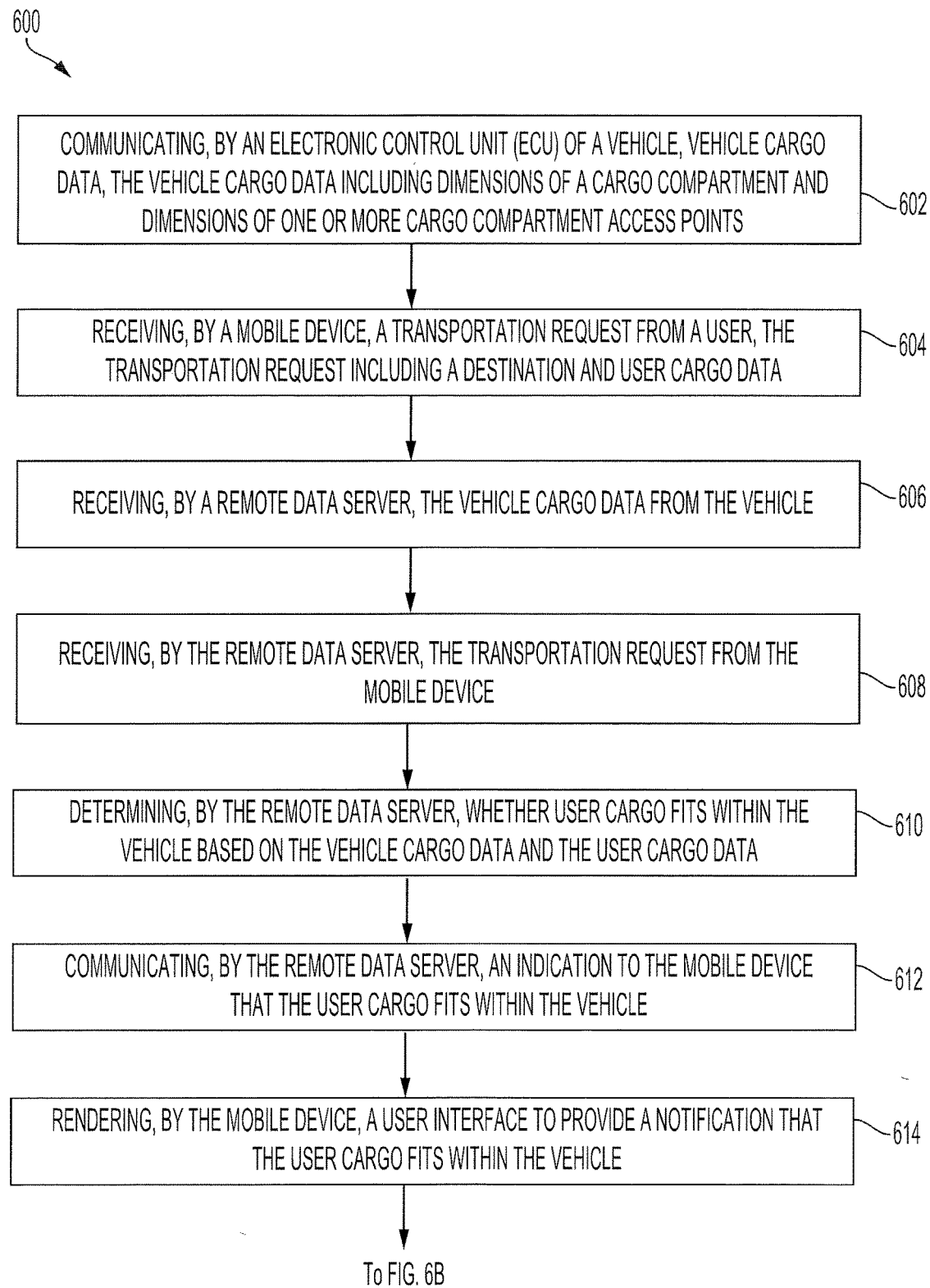
FIGS. 6A and 6B illustrate a flow diagram of a process performed by the system, according to various embodiments of the invention.
Figure 6B:
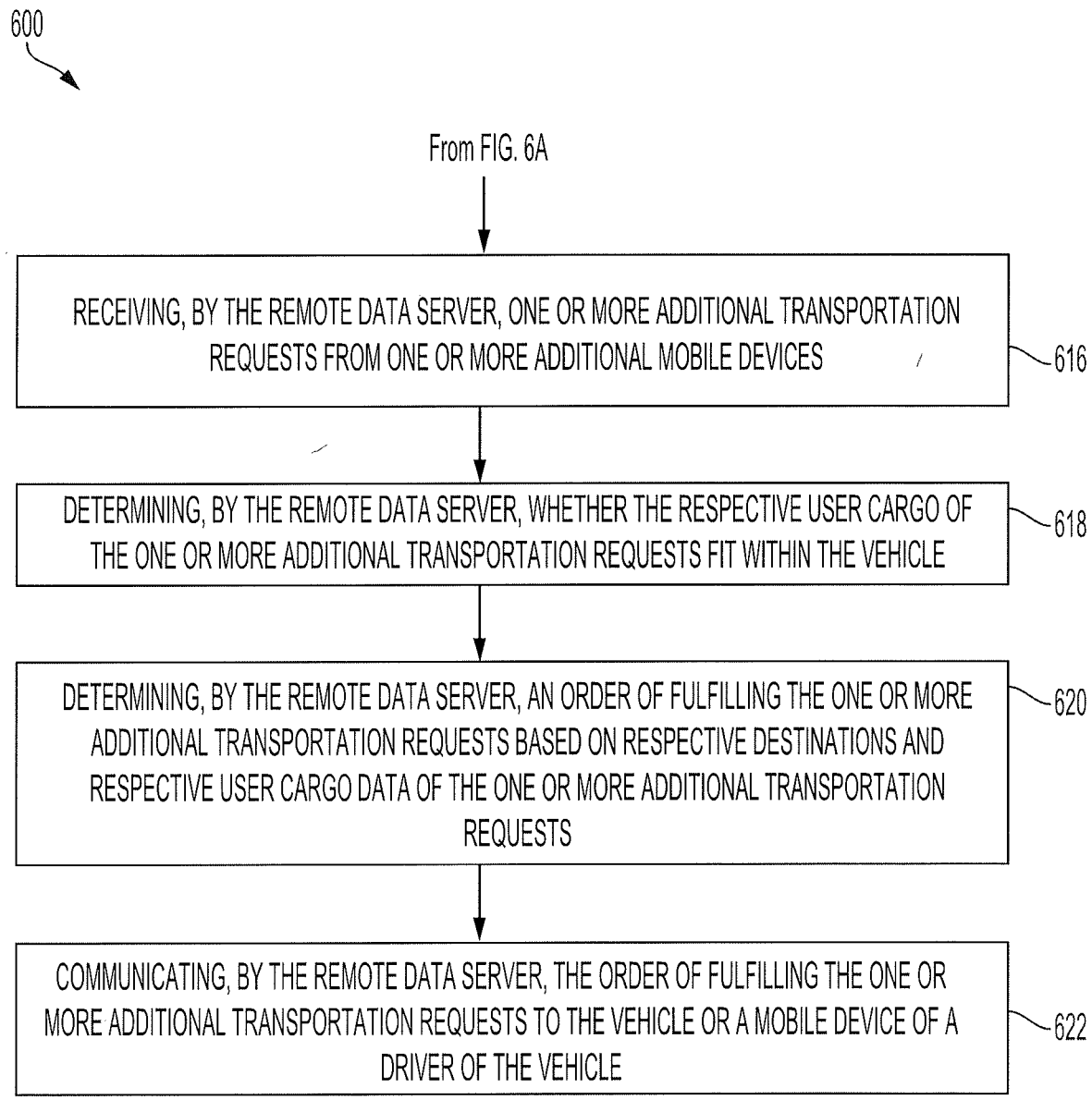

FIGS. 6A and 6B illustrate a flowchart of a process 600 performed by the systems described herein.

An electronic control unit (e.g., ECU 203) of a vehicle (e.g., vehicle 102) communicates vehicle cargo data to a remote data server (e.g., remote data server 536) (step 602). The vehicle cargo data includes dimensions of a cargo compartment (e.g., cargo compartment 104) and dimensions of one or more compartment access points.

A mobile device (e.g., mobile device 522) receives, from a user, a transportation request (step 604). The transportation request includes a destination location and user cargo data. The user may provide the destination location using an input/output device (e.g., input/output device 530). The user may provide the user cargo data manually using the input/output device or the mobile device may automatically detect the user cargo data based on image data from an image sensor (e.g., image sensor 304). When the mobile device automatically detects the user cargo data based on image data, a processor (e.g., processor 524) of the mobile device detects the user cargo data. In some embodiments, machine learning techniques may be used by the mobile device to automatically detect the user cargo data.

The remote data server receives the vehicle cargo data from the vehicle (step 606). A transceiver (e.g., transceiver 508) of the vehicle may communicate with a transceiver (e.g., transceiver 542) of the remote data server. The vehicle (or a processor of the vehicle) may determine an effective cargo capacity based on the vehicle cargo data, as described herein. The effective cargo capacity may be communicated to the remote data server as part of the vehicle cargo data.

The remote data server receives the transportation request from the mobile device (step 608). A transceiver (e.g., transceiver 526) of the mobile device may communicate with the transceiver of the remote data server.

The remote data server (or a processor 538 of the remote data server) determines whether user cargo fits within the vehicle based on the vehicle cargo data and the user cargo data (step 610). The dimensions of the cargo compartment and dimensions of the one or more cargo compartment access points and any cargo currently located in the cargo compartment may all be considered when determining whether the user cargo fits within the vehicle. The remote data server may compare the dimensions of the one or more compartment access points with dimensions of the user cargo to determine whether the user cargo fits within the vehicle.

The remote data server communicates to the mobile device an indication that the user cargo fits within the vehicle when the user cargo fits within the vehicle (step 612). The transceiver of the remote data server may communicate with the transceiver of the mobile device to communicate the indication.

The mobile device renders a user interface (e.g., user interface 314, 454) to provide a notification that the user cargo fits within the vehicle (step 614). The mobile device may be a mobile device of the transportation requester or a mobile device of a transportation provider. Representations (e.g., representations 458) of the cargo within the user interface of the mobile device of the transportation provider may be the notification that the user cargo fits within the vehicle.

In some embodiments, when the user cargo does not fit within the vehicle, a corresponding notification that the user cargo does not fit within the vehicle may be provided to at least one of the mobile device of the transportation requester or the mobile device of the transportation provider.

The remote data server receives one or more additional transportation requests from one or more additional mobile devices (step 616). The one or more additional transportation requests may or may not have associated user cargo data.

The remote data server (or processor of the remote data server) determines whether the respective user cargo of the one or more additional transportation requests fit within the vehicle (step 618).

The remote data server may maintain a status of the cargo capacity of the vehicle. In some embodiments, the remote data server adds and subtracts cargo from vehicle cargo data initially received by from the vehicle. In other embodiments, the remote data server receives (either periodically or continuously) updated vehicle cargo data from the vehicle (detected by vehicle sensors, such as image sensors 202 and/or weight sensors 204).

The remote data server determines an order of fulfilling the one or more additional transportation requests based on respective destination locations and respective user cargo data of the one or more additional transportation requests (step 620). The remote data server may communicate the determined order to the mobile device of the transportation provider (i.e., driver) or the vehicle of the transportation provider using respective transceivers (step 622). The mobile device of the transportation provider or the vehicle may render a graphical user interface showing the determined order (e.g., sequence 456).

If additional cargo data is communicated from the vehicle to the remote data server, and the remote data server determines an update to the order, the remote data server may communicate the updated order to the mobile device or the vehicle, and the mobile device or the vehicle may display the updated order, as illustrated herein in FIGS. 4B and 4C.

The systems and methods described herein improve MaaS technology by improving the accuracy of the capabilities of vehicles used to provide the transportation services. The systems and methods described herein provide a real-time update of the cargo carrying capabilities of the vehicles used to provide the transportation services and assign transportation requests based on the real-time updated vehicle cargo data. The systems and methods described herein reduce or eliminate situations where a vehicle that is not capable of fulfilling the request due to limited available cargo space, thereby increasing accuracy and operational efficiency of the MaaS technology. Conventional MaaS technology does not accurately account for the user cargo and does not provide real-time updated vehicle cargo capabilities using vehicle sensors.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A cargo transportation system comprising:
a vehicle having a cargo compartment, one or more image sensors, and an electronic control unit (ECU) configured to communicate vehicle cargo data, the vehicle cargo data including dimensions of the cargo compartment and dimensions of one or more cargo compartment access points, and the ECU configured to detect the dimensions of the cargo compartment using the one or more image sensors;
a plurality of mobile devices each configured to receive a transportation request from a user, the transportation request including a destination location and user cargo data, and communicate the transportation request;
a remote data server configured to:
receive the vehicle cargo data from the vehicle,
receive the transportation request from each of the plurality of mobile devices,
determine whether user cargo fits within the vehicle based on the vehicle cargo data and the user cargo data,
communicate an indication to the plurality of mobile devices that the user cargo fits within the vehicle, causing the plurality of mobile devices to render a user interface to provide a notification that the user cargo fits within the vehicle,
determine a drop-off sequence for each user based on an arrangement of the respective user cargo and the user cargo data from the plurality of mobile devices, the drop-off sequence being adjustable in real-time such that the drop-off sequence is adjusted based on the remaining cargo in response to user cargo being removed from the vehicle,
transmit a notification indicative of the automatically adjusted drop-off sequence to the plurality of mobile devices, and
transmit a notification to at least one of the plurality of mobile devices associated with a user whose transportation plan is affected by the automatically adjusted drop-off sequence with an option to schedule transportation in a different vehicle.

2. The system of claim 1, wherein the remote data server is further configured to identify, using respective location sensors of a plurality of vehicles, a plurality of eligible vehicles to fulfill the transportation request, and communicate an identification of at least one vehicle of the plurality of eligible vehicles to the plurality of mobile devices.

3. The system of claim 1, wherein the remote data server determines whether the cargo of the user fits within the vehicle by comparing the dimensions of the one or more compartment access points with dimensions of the user cargo.

4. The system of claim 1, wherein the user cargo data includes dimensions of the user cargo and the user manually inputs the dimensions of the user cargo using an input unit of the plurality of mobile devices.

5. The system of claim 1, wherein the user cargo data includes dimensions of the user cargo and the dimensions of the user cargo are automatically detected using one or more image sensors of the plurality of mobile devices.

6. The system of claim 1, wherein the ECU automatically detects the dimensions of the cargo compartment and the dimensions of the one or more cargo compartment access points using the one or more image sensors.

7. The system of claim 6, wherein the ECU continuously detects available cargo space based on one or more objects located within the cargo compartment using the one or more image sensors, and
wherein the available cargo space is used by the remote data server to determine whether the user cargo fits within the vehicle.

8. The system of claim 7, wherein the remote data server is further configured to:
receive one or more additional transportation requests from one or more additional mobile devices,
determine whether the respective user cargo of the one or more additional transportation requests fit within the vehicle,
determine an order of fulfilling the one or more additional transportation requests based on respective destination locations and respective user cargo data of the one or more additional transportation requests, and
communicate the order of fulfilling the one or more additional transportation requests to the vehicle or a mobile device of a driver of the vehicle.

9. The system of claim 7, wherein the vehicle cargo data includes an effective cargo capacity and wherein the ECU is further configured to determine an effective cargo capacity based on a history of continuously detected available cargo space using the one or more image sensors.

10. A method comprising:
detecting, by an electronic control unit (ECU) of a vehicle, dimensions of a cargo compartment using one or more image sensors;
communicating, by the ECU, vehicle cargo data, the vehicle cargo data including the dimensions of the cargo compartment and dimensions of one or more cargo compartment access points;
receiving, by a plurality of mobile devices, a transportation request from a user, each transportation request from the plurality of mobile devices including a destination location and user cargo data;
receiving, by a remote data server, the vehicle cargo data from the vehicle;
receiving, by the remote data server, the transportation request from each of the plurality of mobile devices;
determining, by the remote data server, whether user cargo fits within the vehicle based on the vehicle cargo data and the user cargo data;
communicating, by the remote data server, an indication to the plurality of mobile devices that the user cargo fits within the vehicle;
rendering, by the mobile device, a user interface to provide a notification that the user cargo fits within the vehicle;
determining a drop-off sequence for each user based on an arrangement of the respective user cargo and the user cargo data from the plurality of mobile devices, the drop-off sequence being adjustable in real-time such that the drop-off sequence is adjusted based on the remaining cargo in response to user cargo being removed from the vehicle;
transmitting a notification indicative of the automatically adjusted drop-off sequence to the plurality of mobile devices, and
transmitting a notification to at least one of the plurality of mobile devices associated with a user whose transportation plan is affected by the automatically adjusted drop-off sequence with an option to schedule transportation in a different vehicle.

11. The method of claim 10, further comprising identifying, by the remote data server, using location data detected by respective location sensors of a plurality of vehicles, a plurality of eligible vehicles to fulfill the transportation request, and communicating, by the remote data server, an identification of at least one vehicle of the plurality of eligible vehicles to the plurality of mobile devices.

12. The method of claim 10, wherein the determining of whether the cargo of the user fits within the vehicle is performed by comparing the dimensions of the one or more compartment access points with dimensions of the user cargo.

13. The method of claim 10, wherein the user cargo data includes dimensions of the user cargo, and wherein the method further comprises manually inputting, by the user, the dimensions of the user cargo using an input unit of the plurality of mobile devices.

14. The method of claim 10, wherein the user cargo data includes dimensions of the user cargo and wherein the method further comprises automatically detecting the dimensions of the user cargo using one or more image sensors of the plurality of mobile devices.

15. The method of claim 10, further comprising automatically detecting, by the ECU, the dimensions of the one or more cargo compartment access points using the one or more image sensors.

16. The method of claim 15, further comprising, continuously detecting, by the ECU, available cargo space based on one or more objects located within the cargo compartment using the one or more image sensors, and
wherein the continuously detected available cargo space is used by the remote data server to determine whether the user cargo fits within the vehicle.

17. The method of claim 16, further comprising:
receiving, by the remote data server, one or more additional transportation requests from one or more additional mobile devices;
determining, by the remote data server, whether the respective user cargo of the one or more additional transportation requests fit within the vehicle;
determining, by the remote data server, an order of fulfilling the one or more additional transportation requests based on respective destination locations and respective user cargo data of the one or more additional transportation requests; and
communicating, by the remote data server, the order of fulfilling the one or more additional transportation requests to the vehicle or a mobile device of a driver of the vehicle.

18. The method of claim 16, wherein the vehicle cargo data includes an effective cargo capacity and wherein the ECU is further configured to determine an effective cargo capacity based on a history of continuously detected available cargo space using the one or more image sensors.

19. A cargo transportation system comprising:
a vehicle having a cargo compartment, one or more image sensors, and an electronic control unit (ECU) configured to communicate vehicle cargo data, the vehicle cargo data including dimensions of the cargo compartment and dimensions of one or more cargo compartment access points, and the ECU is configured to detect the dimensions of the cargo compartment using the one or more image sensors; and
a remote data server configured to:
receive user cargo data associated with user cargo from a plurality of mobile devices,
receive the vehicle cargo data,
compare the user cargo data with the vehicle cargo data to determine whether the user cargo fits within the cargo compartment of the vehicle, such that a drop-off sequence is determined based on the user cargo data from a plurality of mobile devices, the drop-off sequence being adjustable in real-time based on the remaining cargo in response to user cargo being removed from the vehicle, and
transmit a notification with an option to schedule transportation in a different vehicle to at least one of the plurality of mobile devices associated with a user whose transportation plan is affected by the drop-off sequence being adjusted in real-time.

20. The cargo transportation system of claim 19, wherein the user cargo data is received by the plurality of mobile devices using an image sensor of the plurality of mobile devices configured to detect image data.

* * * * *